United States Patent
Kaneko et al.

(10) Patent No.: US 12,450,390 B2
(45) Date of Patent: Oct. 21, 2025

(54) BIOLOGICAL INFORMATION ACQUISITION DEVICE, BIOLOGICAL INFORMATION ACQUISITION SYSTEM, BIOLOGICAL INFORMATION ACQUISITION METHOD, AND BIOLOGICAL INFORMATION ACQUISITION PROGRAM

(71) Applicant: FUJIFILM CORPORATION, Tokyo (JP)

(72) Inventors: Yasuhisa Kaneko, Kanagawa (JP); Tomohide Hiragami, Kanagawa (JP); Kenji Nagamiya, Kanagawa (JP); Nobuya Kitamura, Kanagawa (JP); Yasuyuki Hosono, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 216 days.

(21) Appl. No.: 18/451,841

(22) Filed: Aug. 18, 2023

(65) Prior Publication Data

US 2023/0394174 A1 Dec. 7, 2023

Related U.S. Application Data

(63) Continuation of application No. PCT/JP2022/007994, filed on Feb. 25, 2022.

(30) Foreign Application Priority Data

Feb. 26, 2021 (JP) .................................. 2021-030781

(51) Int. Cl.
*G06F 21/62* (2013.01)
*G16H 40/63* (2018.01)
*H04W 12/08* (2021.01)

(52) U.S. Cl.
CPC ......... *G06F 21/6245* (2013.01); *G16H 40/63* (2018.01); *H04W 12/08* (2013.01)

(58) Field of Classification Search
CPC ..... G06F 21/6245; G16H 40/63; H04W 12/08
See application file for complete search history.

(56) References Cited

U.S. PATENT DOCUMENTS 11,438,452 B1 * 9/2022 Abdollahian ........... H04W 4/80
2002/0183006 A1 12/2002 Yasushi et al.
(Continued)

FOREIGN PATENT DOCUMENTS

JP 2002-353976 A 12/2002
WO 2015/046130 A1 4/2015

OTHER PUBLICATIONS

Masaki OKUDA et al., "Development of health promotion system using smartphones and fitness equipment", Lecture proceedings of the 81st National Convention (2019), (4), Interface Human Society and the Computer, Feb. 28, 2019, pp. 4-655 to 4-656.
(Continued)

*Primary Examiner* — Bryan Y Lee
(74) *Attorney, Agent, or Firm* — SOLARIS Intellectual Property Group, PLLC (57) ABSTRACT

A biological information acquisition device comprising: a first processor; and a memory connected to or incorporated in the first processor, wherein the first processor is configured to: acquire biological information of a user; store the biological information in the memory; transmit the biological information to a terminal device owned by the user via wireless communication; and delete the biological information whose transmission has been completed from the memory.

14 Claims, 8 Drawing Sheets

(56) References Cited

U.S. PATENT DOCUMENTS

| | | | |
|---|---|---|---|
| 2011/0302042 A1* | 12/2011 | Hatakeyama | H04M 1/72412 |
| | | | 705/26.1 |
| 2015/0251055 A1* | 9/2015 | Ashby | G09B 19/0038 |
| | | | 482/8 |
| 2016/0203273 A1 | 7/2016 | Tounooka | |
| 2019/0008394 A1* | 1/2019 | Rao | A61B 5/1118 |

OTHER PUBLICATIONS

Raira, "In Japan, start from Anytime Fitness at Ebisu "GymKit" compatible machine has landed in Japan!, The evolution of Apple Watch will never stop", Mac Fan, May 1, 2018, vol. 26, No. 5, pp. 38-39.

International Search Report issued in International Application No. PCT/JP2022/007994 on May 31, 2022.

Written Opinion of the ISA issued in International Application No. PCT/JP2022/007994 on May 31, 2022.

English language translation of the following: Submission of Publications and Other Documents dated May 26, 2025 from the JPO in a Japanese patent application No. 2023-502548 corresponding to the instant patent application.

* cited by examiner

| BIOLOGICAL INFORMATION | | |
|---|---|---|
| TYPE | MEASUREMENT RESULT | DATE AND TIME INFORMATION |
| BODY TEMPERATURE | 36.2 | 2021/1/1 12:16 |
| BLOOD PRESSURE | 80/120 | 2021/1/1 13:05 |
| URINE PROTEIN | NEGATIVE | 2021/1/1 13:23 |
| BODY TEMPERATURE | 36.8 | 2021/1/1 13:48 |
| ⋮ | ⋮ | ⋮ |

| No. | BIOLOGICAL INFORMATION ACQUISITION DEVICE | | | | CONNECTABILITY |
|---|---|---|---|---|---|
| | TYPE | IDENTIFICATION INFORMATION | NAME | INSTALLATION LOCATION | |
| 1 | BODY TEMPERATURE | TM01 | X DEPARTMENT STORE ENTRANCE THERMOMETER | SHINJUKU WARD | POSSIBLE |
| 2 | BODY TEMPERATURE | TM02 | SHINJUKU STATION TICKET GATE THERMOMETER | SHINJUKU WARD | IMPOSSIBLE |
| 3 | BLOOD PRESSURE | – | – | – | IMPOSSIBLE |
| 4 | URINE PROTEIN | – | – | SHINJUKU WARD | POSSIBLE |
| 5 | URINE PROTEIN | – | – | CHUO WARD | IMPOSSIBLE |
| ... | ... | ... | ... | ... | ... |

BIOLOGICAL INFORMATION ACQUISITION DEVICE, BIOLOGICAL INFORMATION ACQUISITION SYSTEM, BIOLOGICAL INFORMATION ACQUISITION METHOD, AND BIOLOGICAL INFORMATION ACQUISITION PROGRAM

CROSS REFERENCE TO RELATED APPLICATIONS

This application is a continuation of International Application No. PCT/JP2022/007994, filed on Feb. 25, 2022, which claims priority from Japanese Patent Application No. 2021-030781, filed on Feb. 26, 2021. The entire disclosure of each of the above applications is incorporated herein by reference.

BACKGROUND

Technical Field

The present invention relates to a biological information acquisition device, a biological information acquisition system, a biological information acquisition method, and a biological information acquisition program.

Related Art

In the related art, biological information is generally transmitted from a measurement device that measures biological information to a terminal device owned by a user. For example, JP2002-353976A discloses that an information communication device (for example, a wristband sensor) acquires user's biological information, automatically recognizes and connects to a counterpart device existing within a communicable range, and transmits the biological information to the counterpart device.

In recent years, biological information of an unspecified number of users has been acquired by biological information acquisition devices having functions of a thermometer, a sphygmomanometer, a urine examination device, and the like disposed in public places. There is a demand for a technique for transmitting biological information of only a user to a terminal device owned by the user (that is, not transmitting biological information of other users) from biological information acquisition devices used by an unspecified number of users. However, JP2002-353976A does not describe a mode in which the number of users whose biological information is to be acquired by the information communication device is unspecified.

Furthermore, since the biological information is considered to be a kind of personal information, it is preferable that the biological information whose transmission has been completed is not left in the biological information acquisition device from a viewpoint of personal information protection. Furthermore, in a case where a terminal device of a transmission target is specified, it is desirable that input of personal information, such as a name, an age, and an address, account information associated with the personal information in advance, and the like is not necessary from a viewpoint of personal information protection.

SUMMARY

The present disclosure provides a biological information acquisition device, a biological information acquisition system, a biological information acquisition method, and a biological information acquisition program capable of protecting personal information.

A first aspect of the present disclosure is a biological information acquisition device comprising: a first processor; and a memory connected to or incorporated in the first processor, in which the first processor acquires biological information of a user, stores the biological information in the memory, transmits the biological information to a terminal device owned by the user via wireless communication, and deletes the biological information whose transmission has been completed from the memory.

According to a second aspect of the present disclosure, in the above aspect, after transmitting the biological information to the terminal device, the first processor may release a connection with the terminal device via the wireless communication and delete a connection history.

According to a third aspect of the present disclosure, in the above aspect, the first processor may establish a connection with the terminal device via the wireless communication after acquiring the biological information.

According to a fourth aspect of the present disclosure, in the third aspect, the first processor may establish the connection with the terminal device via the wireless communication in a case where the connection with the terminal device via the wireless communication is permitted.

According to a fifth aspect of the present disclosure, in the first to third aspects, the first processor may establish a connection with the terminal device via the wireless communication in a case where the terminal device is within a communicable range of the wireless communication.

According to a sixth aspect of the present disclosure, in the first to third aspects, the first processor may establish a connection with the terminal device via the wireless communication in a case where the connection with the terminal device via the wireless communication is permitted in advance and the terminal device is within a communicable range of the wireless communication.

According to a seventh aspect of the present disclosure, in the sixth aspect, in the terminal device, the biological information acquisition device that is a connection permission target via the wireless communication may be set in advance according to at least one of identification information of the biological information acquisition device, a type of the biological information acquired by the biological information acquisition device, or an installation location of the biological information acquisition device, and the first processor may establish the connection with the terminal device via the wireless communication in a case where the biological information acquisition device is included in the connection permission target set in advance in the terminal device and the terminal device is in the communicable range of the wireless communication.

According to an eighth aspect of the present disclosure, in the above aspect, the first processor may settle a usage fee before transmitting the biological information to the terminal device.

In a ninth aspect of the present disclosure, the biological information acquisition device according to the above aspect may be available for use by an unspecified number of users.

According to a tenth aspect of the present disclosure, in the above aspect, the biological information may indicate at least one of a body temperature, a heartbeat, an electrocardiogram, a myoelectricity, a blood pressure, a weight, a body fat percentage, a muscle mass, a bone density, a blood glucose level, a urine sugar, a urine protein, or urine occult blood.

According to an eleventh aspect of the present disclosure, in the above aspect, the wireless communication may be a communication method using at least one of Bluetooth, a BLE beacon, or an RFID.

A twelfth aspect of the present disclosure is a biological information acquisition system comprising: the biological information acquisition device according to the above aspect; and the terminal device including a second processor.

According to a thirteenth aspect of the present disclosure, in the twelfth aspect, the terminal device may further include a storage unit connected to or incorporated in the second processor, and the second processor may store the biological information received from the biological information acquisition device in the storage unit.

A fourteenth aspect of the present disclosure is a biological information acquisition method in which a computer executes processing of: acquiring biological information of a user; storing the biological information in a memory; transmitting the biological information to a terminal device owned by the user via wireless communication; and deleting the biological information whose transmission has been completed from the memory.

A fifteenth aspect of the present disclosure is a biological information acquisition program for causing a computer to execute processing of: acquiring biological information of a user; storing the biological information in a memory; transmitting the biological information to a terminal device owned by the user via wireless communication; and deleting the biological information whose transmission has been completed from the memory.

According to the above-described aspects, the biological information acquisition device, the biological information acquisition system, the biological information acquisition method, and the biological information acquisition program of the present disclosure can protect personal information.

DETAILED DESCRIPTION

Hereinafter, exemplary embodiments for implementing the technique of the present disclosure will be described in detail with reference to the drawings.

First Exemplary Embodiment

Figure 1:
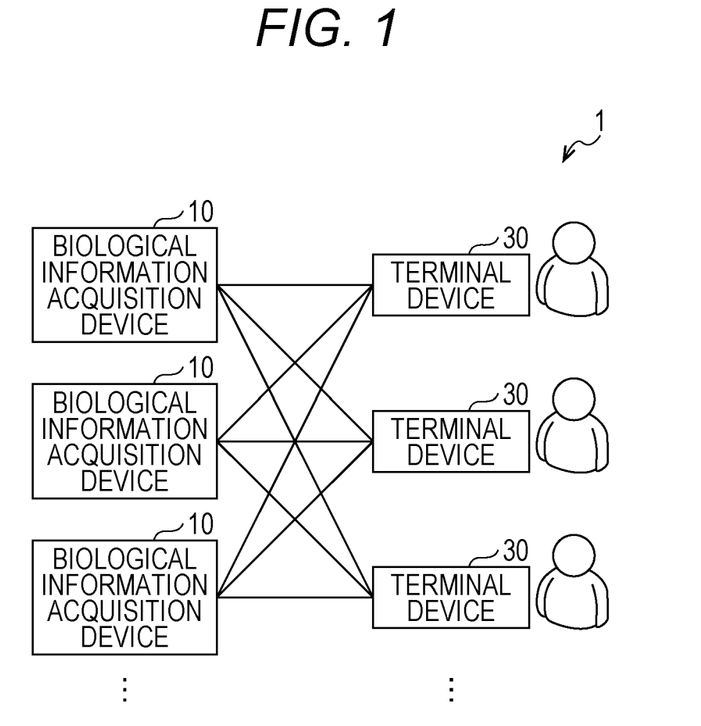
FIG. 1 is a schematic configuration diagram of a biological information acquisition system.

An example of a configuration of a biological information acquisition system 1 according to the present exemplary embodiment will be described with reference to FIG. 1. As illustrated in FIG. 1, the biological information acquisition system 1 includes at least one biological information acquisition device 10, and at least one terminal device 30 each owned by a different owner. The biological information acquisition device 10 and the terminal device 30 can communicate with each other via wireless communication. As a wireless communication method, at least one of Bluetooth (registered trademark), a Bluetooth Low Energy (BLE) beacon, or a radio frequency identifier (RFID) can be applied.

The biological information acquisition device 10 has a function of acquiring biological information of a user. The biological information is, for example, information indicating at least one of body temperature, heartbeat, electrocardiogram, myoelectricity, blood pressure, weight, body fat percentage, muscle mass, bone density, blood glucose level, urine sugar, urine protein, or urine occult blood. Furthermore, the biological information acquisition device 10 is a device that can be used by an unspecified number of users, and is installed in a place where people gather, such as a hospital, a pharmacy, a department store, a shopping mall, a convenience store, a station, an airport, a company, a public building, an elderly person facility, and a hot spring facility.

An example of a hardware configuration of the biological information acquisition device 10 according to the present exemplary embodiment will be described with reference to FIG. 2.

Figure 2:
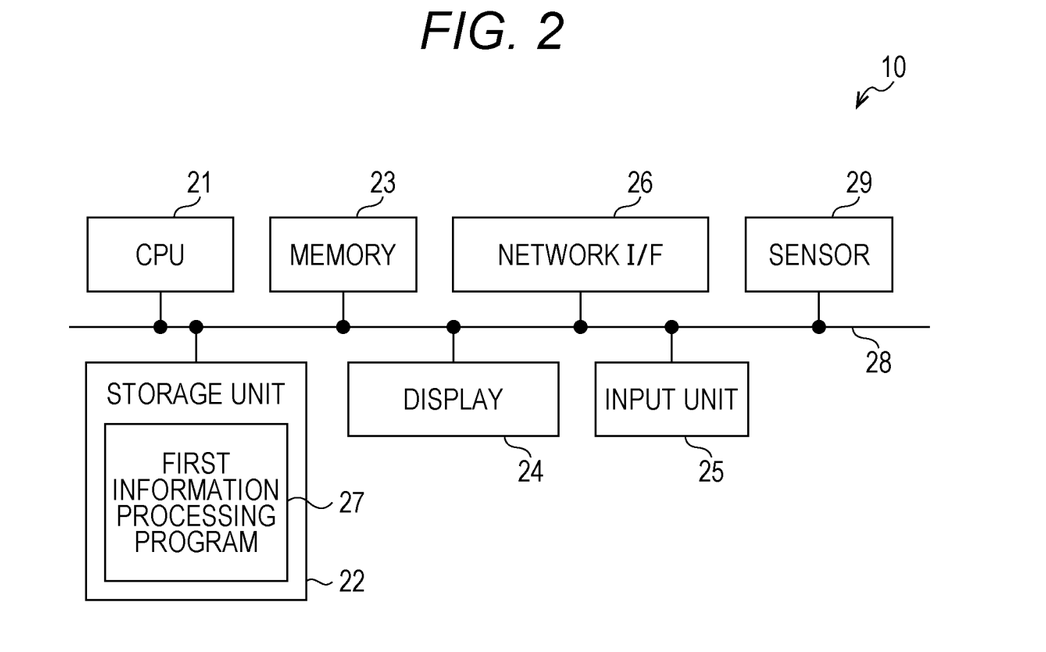
FIG. 2 is a block diagram illustrating an example of a hardware configuration of a biological information acquisition device.

As illustrated in FIG. 2, the biological information acquisition device 10 includes a central processing unit (CPU) 21, a non-volatile storage unit 22, and a memory 23 as a temporary storage area. Furthermore, the biological information acquisition device 10 includes a display 24 such as a liquid-crystal display, an input unit 25 such as a button, a network interface (I/F) 26 that performs wireless communication with a terminal device 30 and an external network (not illustrated), and a sensor 29 that measures biological information. The CPU 21, the storage unit 22, the memory 23, the display 24, the input unit 25, the network I/F 26, and the sensor 29 are connected through a bus 28 such as a system bus or a control bus so as to exchange various information with each other.

The storage unit 22 is implemented by, for example, a storage medium such as a hard disk drive (HDD), a solid-state drive (SSD), or a flash memory. A first information processing program 27 in the biological information acquisition device 10 is stored in the storage unit 22.

The CPU 21 reads out the first information processing program 27 from the storage unit 22, expands the first information processing program 27 in the memory 23, and executes the expanded first information processing program 27. The CPU 21 is an example of a first processor of the present disclosure, and the memory 23 is an example of a memory of the present disclosure.

As the sensor 29, for example, a known measuring instrument capable of measuring the above-described various kinds of biological information, such as a thermometer, an electrocardiograph, a sphygmomanometer, a body composition meter, a blood glucose level measuring instrument, and a urine examination device, can be applied. Note that the sensor 29 may be incorporated into the biological information acquisition device 10, or may be an independent device that is connected to the biological information acquisition device 10 by wired or wireless communication so that biological information can be exchanged.

Figure 3:
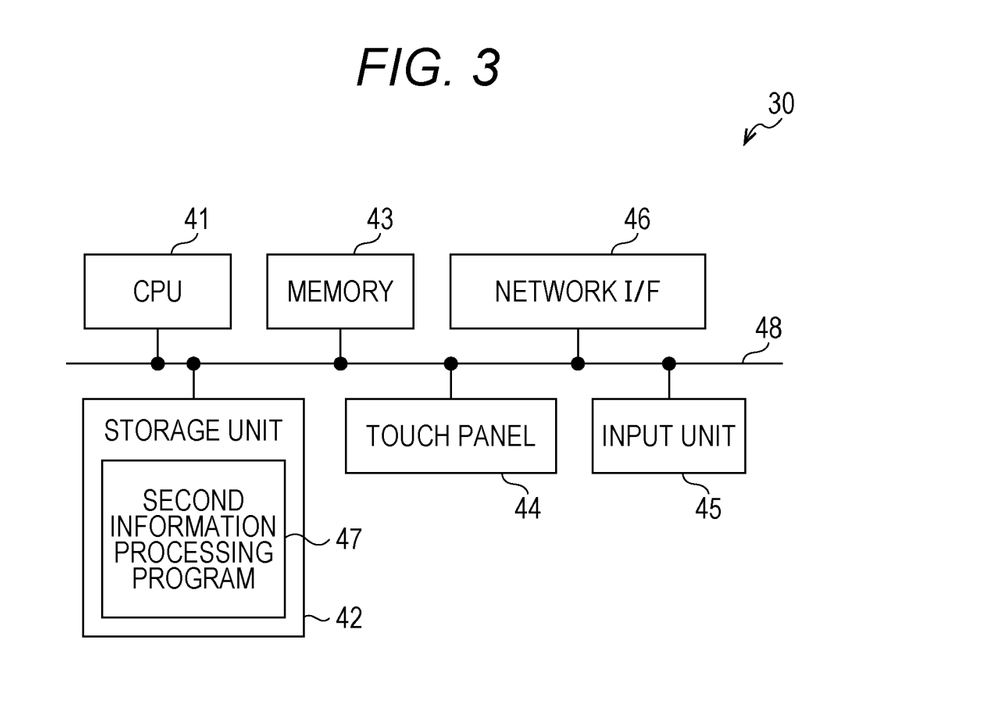
FIG. 3 is a block diagram illustrating an example of a hardware configuration of a terminal device.

The terminal device 30 is a device owned by the user, and, for example, a wearable terminal such as a smartphone, a tablet terminal, and a smartwatch can be applied. An example of a hardware configuration of the terminal device 30 according to the present exemplary embodiment will be described with reference to FIG. 3. As illustrated in FIG. 3, the terminal device 30 includes a CPU 41, a non-volatile storage unit 42, and a memory 43 as a temporary storage area. Furthermore, the terminal device 30 includes a touch panel 44, an input unit 45 such as a button, and a network I/F 46 that performs wireless communication with the biological information acquisition device 10 and an external network (not illustrated). The CPU 41, the storage unit 42, the memory 43, the touch panel 44, the input unit 45, and the network I/F 46 are connected through a bus 48 such as a system bus or a control bus so as to exchange various information with each other.

The storage unit 42 is implemented by, for example, a storage medium such as an HDD, an SSD, or a flash memory. A second information processing program 47 in the terminal device 30 is stored in the storage unit 42. The CPU 41 reads out the second information processing program 47 from the storage unit 42, expands the second information processing program 47 in the memory 43, and executes the expanded second information processing program 47. The CPU 41 is an example of a second processor according to the present disclosure, and the storage unit 42 is an example of a storage unit according to the present disclosure.

Figure 4:
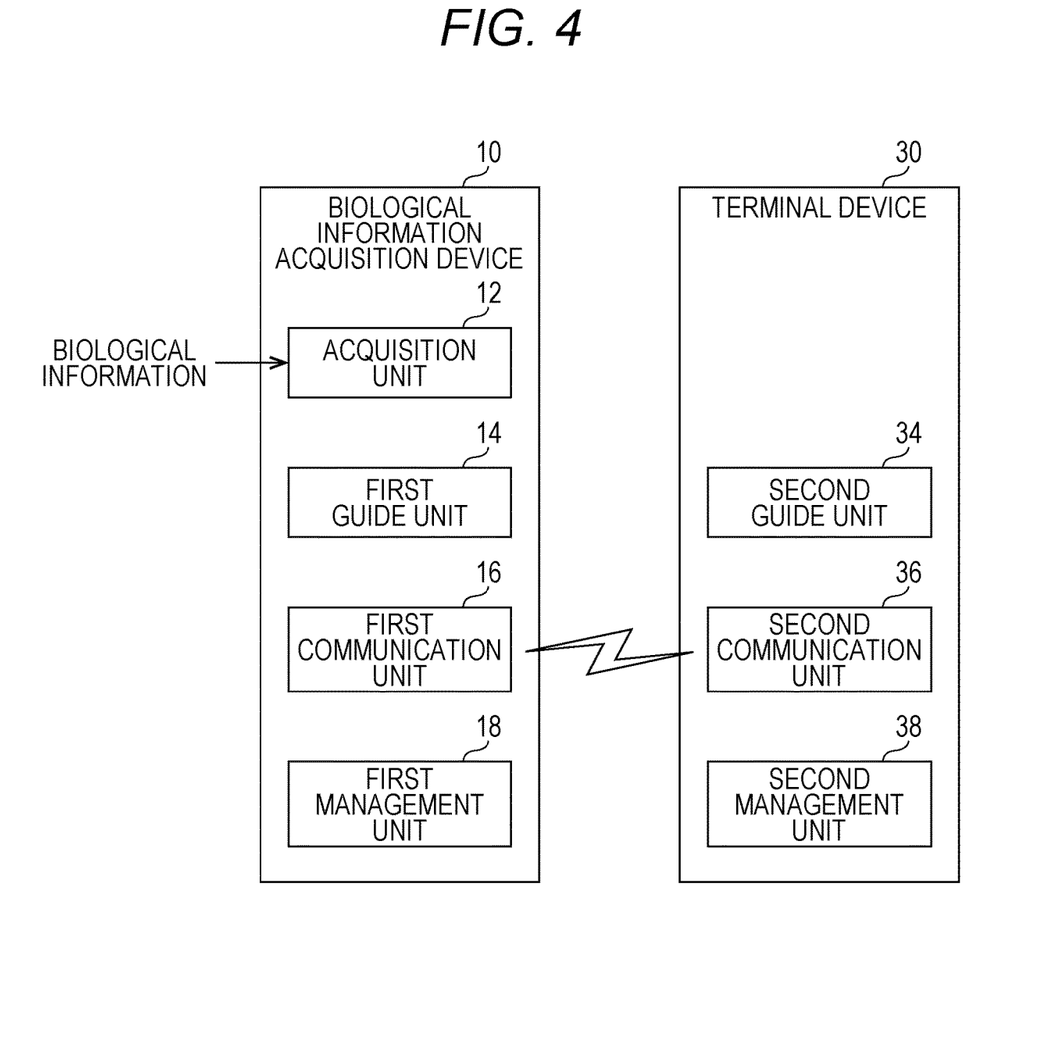
FIG. 4 is a block diagram illustrating an example of a functional configuration of the biological information acquisition device and the terminal device.

Next, an example of a functional configuration of the biological information acquisition device 10 and the terminal device 30 according to the present exemplary embodiment will be described with reference to FIG. 4. As illustrated in FIG. 4, the biological information acquisition device 10 includes an acquisition unit 12, a first guide unit 14, a first communication unit 16, and a first management unit 18. The CPU 21 executes the first information processing program 27 to function as the acquisition unit 12, the first guide unit 14, the first communication unit 16, and the first management unit 18.

The acquisition unit 12 acquires biological information of the user measured by the sensor 29, and stores the biological information in the memory 23. The biological information includes a type of the biological information, a measurement result represented by at least one of a measurement value of the biological information or a negative or positive determination result based on the measurement value, and date and time information indicating the date and time when the biological information was acquired (see FIG. 5).

The first guide unit 14 performs various kinds of guidance to the user using the display 24. For example, the first guide unit 14 displays the guidance, such as a measurement method of the biological information by the sensor 29, on the display 24. Furthermore, for example, the first guide unit 14 displays the biological information measured by the sensor 29 on the display 24. Furthermore, for example, the first guide unit 14 displays, on the display 24, guidance for prompting the user to select whether or not to transmit the biological information measured by the sensor 29 to the terminal device 30. According to such a mode, the user who uses the biological information acquisition device 10 can measure the biological information, check a measurement result on the display 24 of the biological information acquisition device 10, and select whether or not to transmit the biological information to the terminal device 30 owned by the user. For example, the user can select whether or not to transmit the biological information by operating the input unit 25.

In a case where the user selects to transmit the biological information to the terminal device 30, the first communication unit 16 establishes a connection with the terminal device 30 via wireless communication after the acquisition unit 12 acquires the biological information. Specifically, the first communication unit 16 requests the terminal device 30 for a connection via wireless communication after the acquisition unit 12 acquires the biological information, and establishes a connection with the terminal device 30 via wireless communication in a case where the connection with the terminal device 30 via wireless communication is permitted. To "establish a connection" means to establish a one-to-one connection between the biological information acquisition device 10 and the terminal device 30. For example, in a case where the method of wireless communication is Bluetooth, the first communication unit 16 performs pairing with the terminal device 30.

After establishing the connection with the terminal device 30 via wireless communication, the first communication unit 16 transmits the biological information acquired by the acquisition unit 12 to the terminal device 30 via wireless communication. After transmitting the biological information to the terminal device 30, the first communication unit 16 releases the connection with the terminal device 30 via wireless communication.

The first management unit 18 deletes, from the memory 23, the biological information whose transmission to the terminal device 30 by the first communication unit 16 has been completed. Furthermore, the first management unit 18 deletes a connection history with the terminal device 30. "Deletion of the connection history" means deleting the information necessary for the connection acquired when the connection with the terminal device 30 via wireless communication is established. For example, in a case where the method of wireless communication is Bluetooth, the first management unit 18 releases the pairing. Therefore, after the first management unit 18 deletes the connection history, in order for the first communication unit 16 to establish the connection with the terminal device 30 via wireless communication again, it is necessary to acquire information necessary for the connection again. For example, in a case where the method of wireless communication is Bluetooth, pairing needs to be performed again.

On the other hand, in a case where the user selects not to transmit the biological information to the terminal device 30, the first management unit 18 deletes the biological information from the memory 23 when the display of the biological information on the display 24 by the first guide unit 14 ends. That is, regardless of whether or not the biological information acquisition device 10 transmits the biological information to the terminal device 30, the biological information acquisition device 10 normally has a function of deleting information related to personal information such as the biological information of the user and information on the terminal device 30 owned by the user.

As illustrated in FIG. 4, the terminal device 30 includes a second guide unit 34, a second communication unit 36, and a second management unit 38. By executing the second information processing program 47, the CPU 41 functions as the second guide unit 34, the second communication unit 36, and the second management unit 38.

The second guide unit 34 performs various kinds of guidance to the user using the touch panel 44. For example, in a case where there is a connection request via wireless communication from the biological information acquisition device 10, the second guide unit 34 causes the touch panel 44 to display guidance such as "Do you want to connect to the biological information acquisition device?" to allow the user to select whether or not to permit a connection with the biological information acquisition device 10.

The second communication unit 36 receives a request for connection via wireless communication from the biological information acquisition device 10. Furthermore, in a case where the connection is permitted by the user, the second communication unit 36 establishes the connection with the biological information acquisition device 10 via wireless communication.

Furthermore, the second communication unit 36 receives biological information from the biological information acquisition device 10 via wireless communication. After receiving the biological information, the second communication unit 36 releases the connection with the biological information acquisition device 10 via wireless communication.

Figure 5:
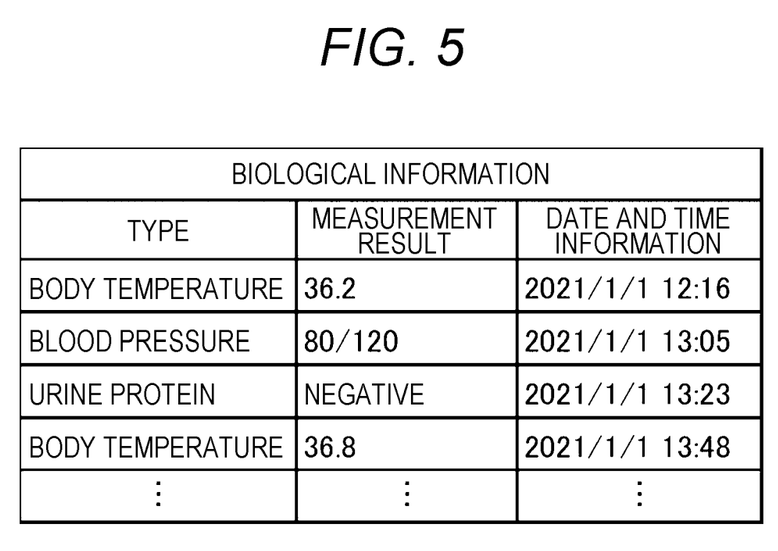
FIG. 5 illustrates an example of biological information.

The second management unit 38 stores the biological information received by the second communication unit 36 from the biological information acquisition device 10 in the storage unit 42. FIG. 5 illustrates an example of the biological information stored in the storage unit 42.

In this way, the biological information received from each biological information acquisition device 10 is accumulated in the storage unit 42.

The biological information stored in the storage unit 42 may be displayed on the touch panel 44 by the second guide unit 34 in a case where there is a request for viewing from the user.

Figure 6:
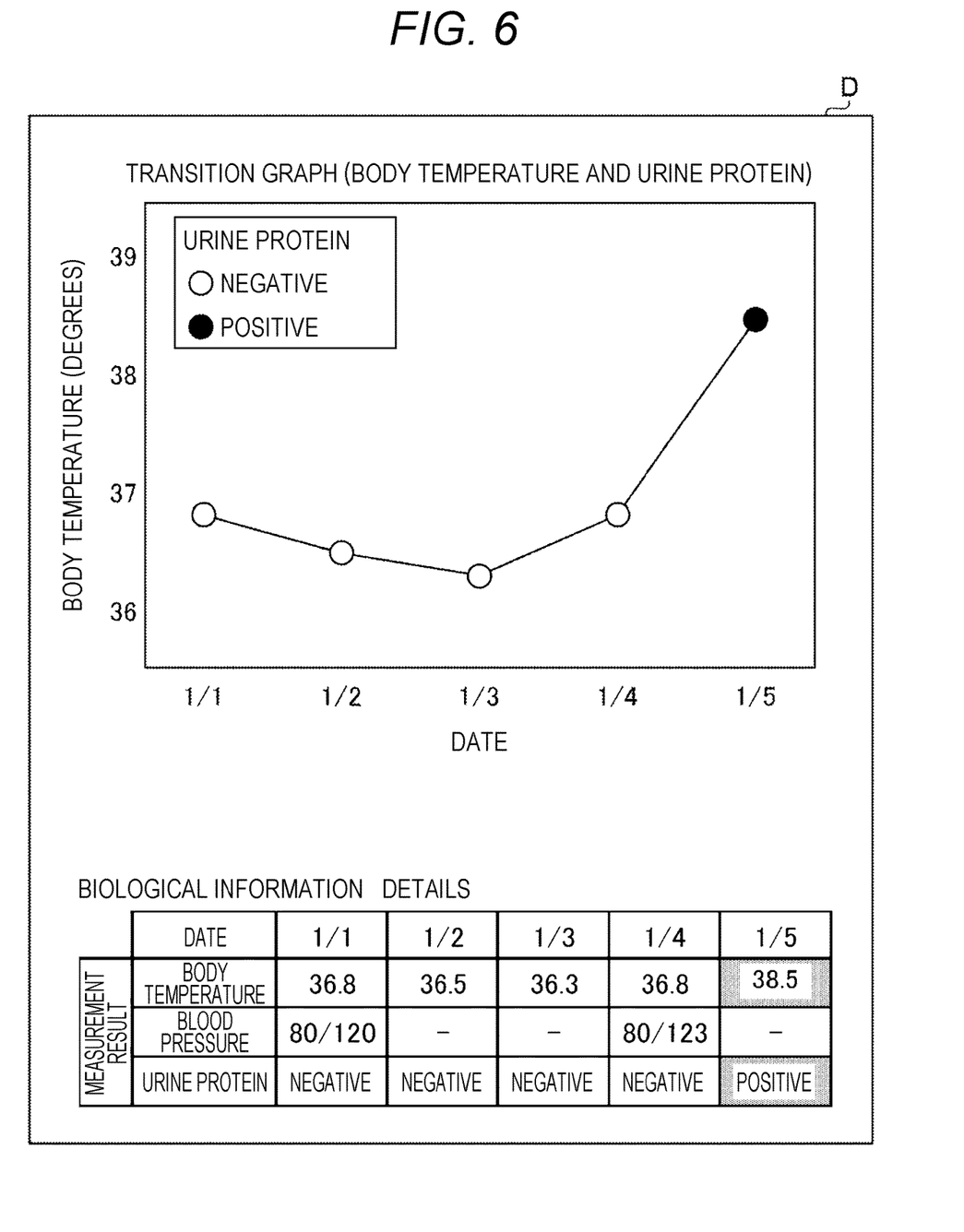
FIG. 6 illustrates an example of a screen displayed on the terminal device.

FIG. 6 illustrates an example of a screen D displayed on the touch panel 44 by the second guide unit 34. In the example of FIG. 6, the maximum body temperature for each date is illustrated by a line graph, and a determination result of urine protein for each date is illustrated by changing the color of the plot. As described above, the second guide unit 34 may process and display the biological information in an easy-to-see format using a graph, color coding, or the like.

Next, actions of the biological information acquisition device 10 and the terminal device 30 according to the present exemplary embodiment will be described with reference to FIG. 7.

Figure 7:
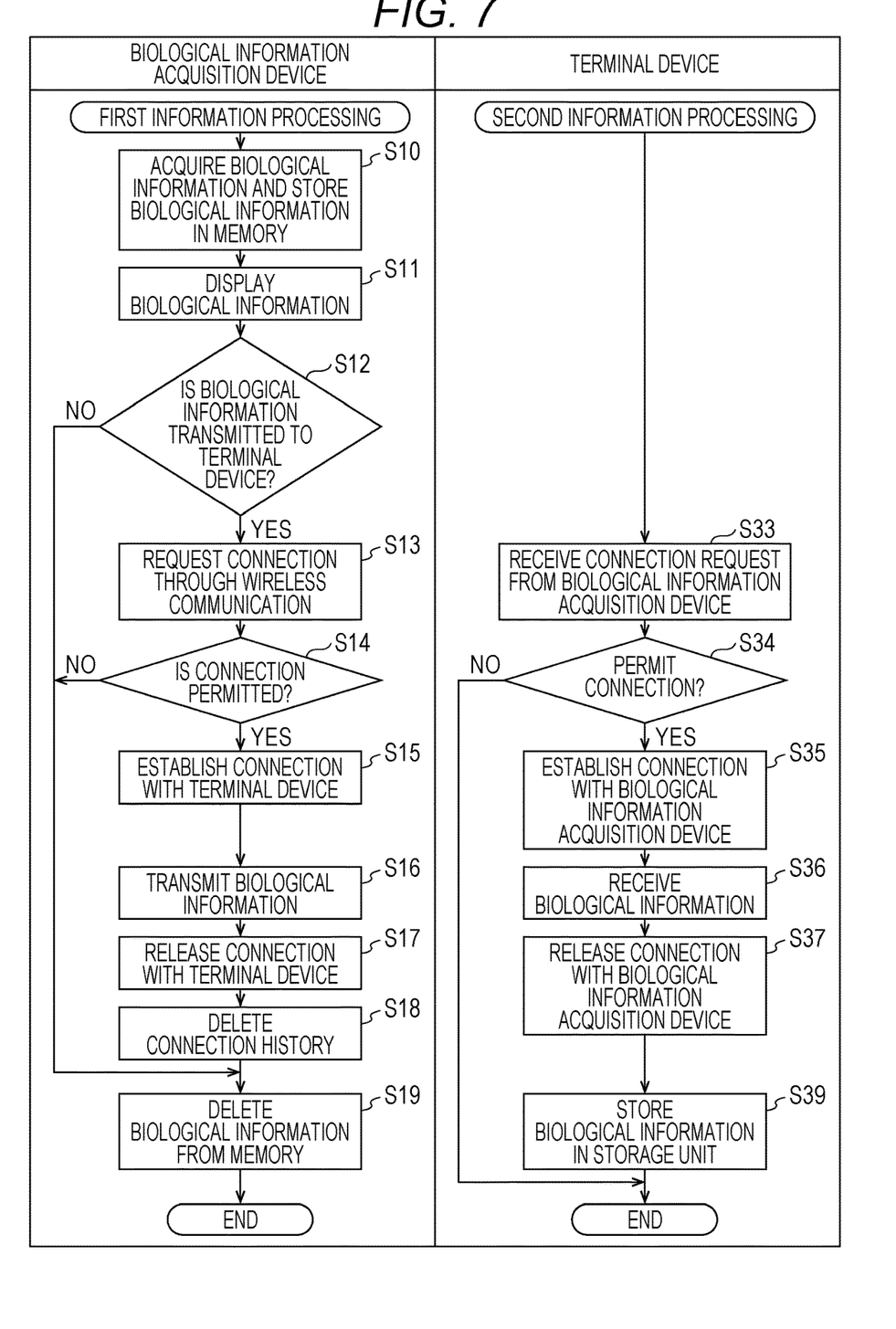
FIG. 7 is a flowchart illustrating an example of information processing according to a first exemplary embodiment.

FIG. 7 illustrates a flowchart illustrating first information processing executed in the biological information acquisition device 10 and a flowchart illustrating second information processing executed in the terminal device 30 side by side. As described above, since there is processing performed between the biological information acquisition device 10 and the terminal device 30, for ease of understanding, corresponding steps between the devices are described side by side.

In the biological information acquisition device 10, the CPU 21 executes the first information processing program 27 to execute the first information processing illustrated in FIG. 7. The first information processing is executed in a case where the measurement of the biological information by the sensor 29 is completed. Furthermore, in the terminal device 30, the CPU 41 executes the second information processing program 47 to execute the second information processing illustrated in FIG. 7. The second information processing is started in a case where a request for connection is received from the biological information acquisition device 10 (step S33).

First, the first information processing executed in the biological information acquisition device 10 will be described. In step S10, the acquisition unit 12 acquires the biological information of the user measured by the sensor 29, and stores the biological information in the memory 23. In step S11, the first guide unit 14 displays the biological information acquired in step S10 on the display 24. In step S12, the first guide unit 14 displays, on the display 24, guidance for prompting the user to select whether or not to transmit the biological information acquired in step S10 to the terminal device 30, and receives the selection. For example, the user can select whether or not to transmit the biological information by operating the input unit 25.

In a case where an affirmative determination is made in step S12 (that is, in a case where the biological information is transmitted to the terminal device 30), the process proceeds to step S13, and the first communication unit 16 requests the terminal device 30 to connect via wireless communication and stands by until the connection is permitted or prohibited in step S14. In a case where an affirmative determination is made in step S14 (that is, in a case where the connection with the terminal device 30 is permitted), the process proceeds to step S15, and the first communication unit 16 establishes the connection with the terminal device 30 via wireless communication. In step S16, the first communication unit 16 transmits the biological information acquired in step S10 to the terminal device 30 via wireless communication. In step S17, the first communication unit 16 releases the connection with the terminal device 30 via wireless communication.

In step S18, the first management unit 18 deletes the connection history with the terminal device 30 with which the connection has been established in steps S15 to S17. In step S19, the first management unit 18 stores the biological information in the memory 23 in step S10, deletes, from the memory 23, the biological information whose transmission to the terminal device 30 has been completed in step S16, and ends the first information processing.

On the other hand, in a case where a negative determination is made in step S12 (that is, in a case where the biological information is not transmitted to the terminal device 30) and in a case where a negative determination is made in step S14 (that is, in a case where the connection with the terminal device 30 is prohibited), the process proceeds to step S19 described above, and the first information processing is ended.

Next, the second information processing executed in the terminal device 30 will be described. In step S33, the second guide unit 34 receives a request for connection via wireless communication from the biological information acquisition device 10. In step S34, the second guide unit 34 displays, on the touch panel 44, guidance for prompting the user to select whether or not to permit the connection with the biological information acquisition device 10, and stands by until the connection is permitted or prohibited in step S34.

In a case where an affirmative determination is made in step S34 (that is, in a case where the connection with the biological information acquisition device 10 is permitted), the process proceeds to step S35, and the second communication unit 36 establishes the connection with the biological information acquisition device 10 via wireless communication. In step S36, the second communication unit 36 receives the biological information from the biological information acquisition device 10 via wireless communication. In step S37, the second communication unit 36 releases the connection with the biological information acquisition device 10 via wireless communication. In step S39, the second management unit 38 stores the biological information received in step S36 in the storage unit 42, and ends the second information processing.

On the other hand, in a case where a negative determination is made in step S34 (that is, in a case where the connection with the biological information acquisition device 10 is prohibited), the second information processing ends without establishing the connection with the biological information acquisition device 10 and receiving the biological information.

As described above, the biological information acquisition device 10 includes at least one processor, and the processor acquires the biological information of the user, stores the biological information in the memory 23, transmits the biological information to the terminal device 30 owned by the user via wireless communication, and deletes the biological information whose transmission has been completed from the memory 23. That is, since the biological information which is considered to be a kind of personal information is not left in the biological information acquisition device 10, the personal information can be protected.

Furthermore, the biological information acquisition device 10 according to the first exemplary embodiment establishes the connection with the terminal device 30 via wireless communication after acquiring the biological information. That is, when the biological information is acquired, since it is not necessary to input personal information, such as a name, an age, and an address of the user, account information associated with the personal information in advance, and the like, it is possible to contribute to protection of the personal information.

Note that, in the first exemplary embodiment, a mode has been described in which the biological information acquisition device 10 confirms with the user whether or not the connection with the terminal device 30 via the wireless communication is possible and establishes the connection with the terminal device 30 via the wireless communication in a case where the connection is permitted, but the present disclosure is not limited thereto. For example, the first communication unit 16 may establish the connection with the terminal device 30 via wireless communication in a case where the terminal device 30 is within a communicable range of the wireless communication. That is, the first communication unit 16 may automatically connect with the terminal device 30 in the communicable range of the wireless communication without confirming with the user whether or not the connection is possible.

Second Exemplary Embodiment

In a second exemplary embodiment, a mode will be described in which the biological information acquisition device 10 as a connection permission target is set in advance in the terminal device 30, and the connection between the biological information acquisition device 10 and the terminal device 30 is automatically established (that is, without confirming with the user whether or not the connection is possible). Hereinafter, an example of functions of the biological information acquisition device 10 and the terminal device 30 according to the present exemplary embodiment will be described, but overlapping description of the same configuration and action as in the first exemplary embodiment will be omitted.

In the biological information acquisition device 10, the first communication unit 16 establishes a connection with the terminal device 30 via wireless communication in a case where the connection with the terminal device 30 via wireless communication is permitted in advance and the terminal device 30 is within a communicable range of the wireless communication. Specifically, the first communication unit 16 establishes the connection with the terminal device 30 via wireless communication in a case where the biological information acquisition device itself is included in the connection permission targets set in advance in the terminal device 30 and the terminal device 30 is in the communicable range of the wireless communication.

For example, the first communication unit 16 transmits information (hereinafter, referred to as "device information") indicating at least one of identification information of the biological information acquisition device itself, a type of the biological information acquired by the biological information acquisition device itself, or an installation location of the biological information acquisition device itself to the terminal device 30 within the communicable range of the wireless communication (that is, a distance that radio waves of the wireless communication reach) along with a request for connection via the wireless communication. Thereafter, when a notification of permission to connect is received from the terminal device 30, the first communication unit 16 establishes the connection with the terminal device 30 via wireless communication.

In the terminal device 30, the second communication unit 36 receives the request for connection via wireless communication and the device information from the biological information acquisition device 10. Thereafter, the second communication unit 36 determines whether or not the biological information acquisition device 10 is included in the connection permission targets on the basis of the device information. The determination may be performed, for example, by collating the received device information with a table in which the biological information acquisition devices 10 as the connection permission targets are predetermined based on the device information.

Figure 8:
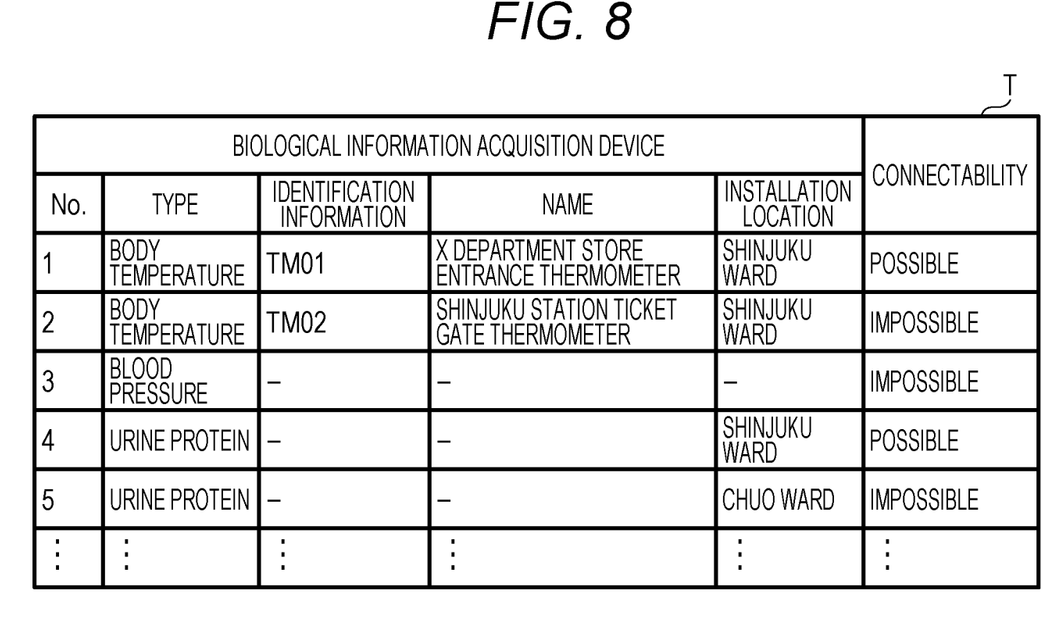
FIG. 8 illustrates an example of a table defining biological information acquisition devices that are connection permission targets.

FIG. 8 illustrates an example of a table T in which the biological information acquisition devices 10 as the connection permission targets through wireless communication are preset according to the device information. In FIG. 8, a case where "connectability" is "possible" is a connection permission target, and a case where "connectability" is "impossible" is not a connection permission target. For example, the table T may be set in advance by the user and stored in the storage unit 42.

For example, as illustrated in Nos. 1 and 2 of FIG. 8, the connectability may be individually set according to the identification information of the biological information acquisition devices 10. Furthermore, for example, as illustrated in No. 3 of FIG. 8, the connectability may be individually set according to the type of the biological information acquired by the biological information acquisition device 10. Furthermore, for example, as illustrated in Nos. 4 and 5 of FIG. 8, the connectability may be individually set according to the installation locations of the biological information acquisition devices 10. Furthermore, for example, the connectability may be individually set according to the name of the biological information acquisition device 10, such as making the biological information acquisition device 10 whose name includes "entrance" a connection permission target. Furthermore, these examples may be appropriately combined. Note that, in FIG. 8, a ward is illustrated as an example of the "installation location", but the present disclosure is not limited thereto, and, for example, the connectability may be individually set according to a prefecture, a municipality, a facility, a structure in the facility such as an entrance and an exit, and a toilet.

In a case where the determination of whether or not the biological information acquisition device 10 is included in the connection permission targets is completed, the second communication unit 36 transmits the determination result to the first communication unit 16, and in a case where the connection is permitted, the second communication unit 36 establishes the connection with the biological information acquisition device 10 via wireless communication.

Figure 9:
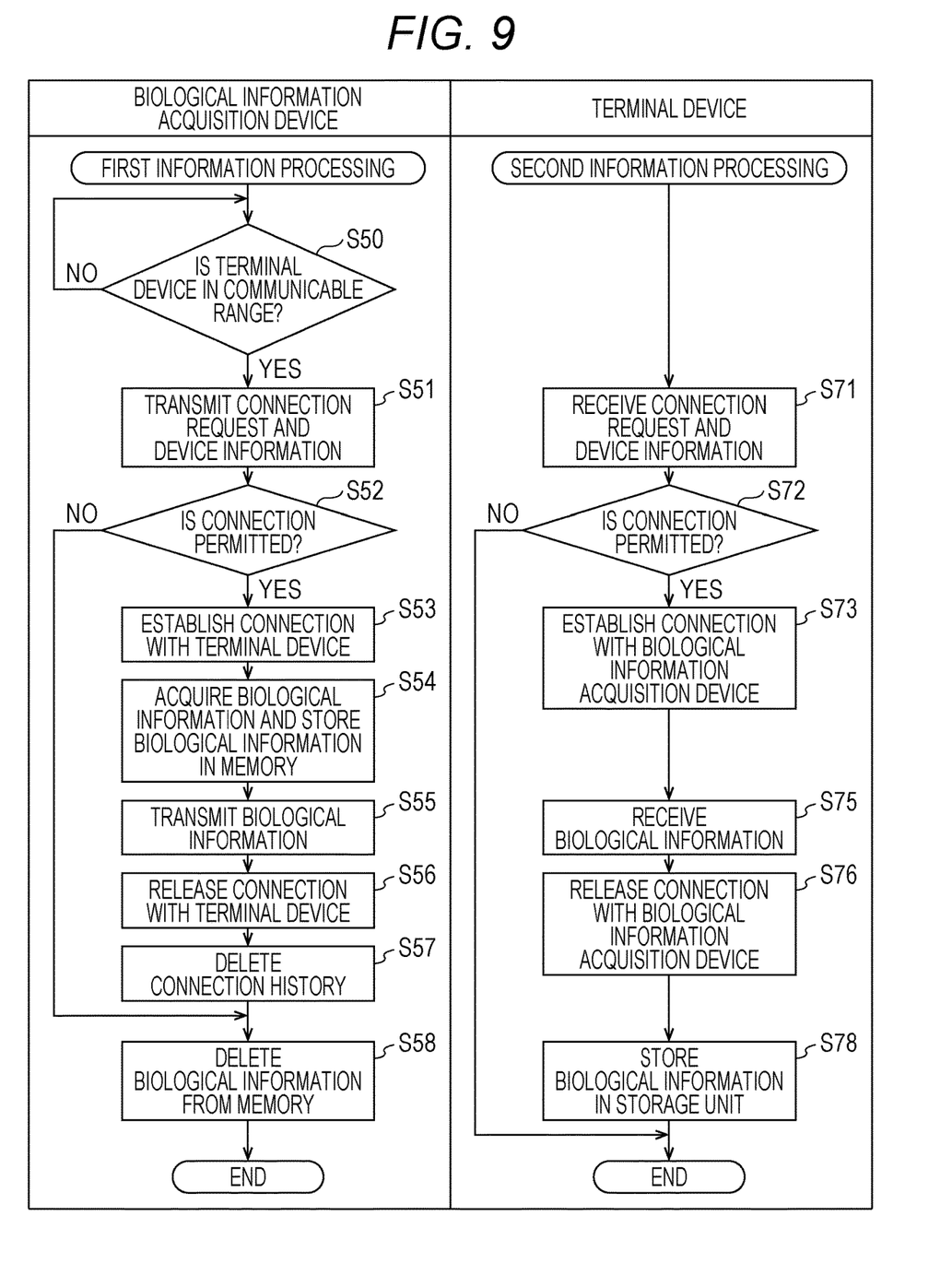
FIG. 9 is a flowchart illustrating an example of information processing according to a second exemplary embodiment.

Next, an action of the biological information acquisition device 10 and the terminal device 30 according to the present exemplary embodiment will be described with reference to FIG. 9. FIG. 9 illustrates a flowchart illustrating the first information processing executed in the biological information acquisition device 10 and a flowchart illustrating the second information processing executed in the terminal device 30 side by side. As described above, since there is processing performed between the biological information acquisition device 10 and the terminal device 30, for ease of understanding, corresponding steps between the devices are described side by side.

In the biological information acquisition device 10, the CPU 21 executes the first information processing program 27 to execute the first information processing illustrated in FIG. 9. The first information processing is executed, for example, in a case where there is an instruction to start the processing from the user through the input unit 25. Furthermore, in the terminal device 30, the CPU 41 executes the second information processing program 47 to execute the second information processing illustrated in FIG. 9. The second information processing is started in a case where a request for connection is received from the biological information acquisition device 10 (step S71).

First, the first information processing executed in the biological information acquisition device 10 will be described. In step S50, the first communication unit 16 stands by until the first communication unit 16 detects that the terminal device 30 is in the communicable range of the wireless communication. In step S51, the first communication unit 16 transmits the device information of the biological information acquisition device itself together with the request for connection via wireless communication to the terminal device 30 detected in step S50. In step S52, the first communication unit 16 stands by until the determination result of whether or not the connection is possible is received from the terminal device 30.

In a case where an affirmative determination is made in step S52 (that is, in a case where the connection with the terminal device 30 is permitted), the process proceeds to step S53, and the first communication unit 16 establishes a connection with the terminal device 30 through wireless communication. In step S54, the acquisition unit 12 acquires the biological information of the user measured by the sensor 29, and stores the biological information in the memory 23. In step S55, the first communication unit 16 transmits the biological information acquired in step S54 to the terminal device 30 through wireless communication. In step S56, the first communication unit 16 releases the connection with the terminal device 30 via wireless communication.

In step S57, the first management unit 18 deletes the connection history with the terminal device 30 with which the connection has been established in steps S53 to S56. In step S58, the first management unit 18 stores the biological information in the memory 23 in step S54, deletes, from the memory 23, the biological information whose transmission to the terminal device 30 has been completed in step S55, and ends the first information processing.

On the other hand, in a case where a negative determination is made in step S52 (that is, in a case where the connection with the terminal device 30 is prohibited), the process proceeds to step S58 described above, and the first information processing ends.

Next, the second information processing executed in the terminal device 30 will be described. In step S71, the second communication unit 36 receives the request for connection via wireless communication and the device information from the biological information acquisition device 10. In step S72, the second communication unit 36 determines whether or not the biological information acquisition device 10 is included in the connection permission targets on the basis of the device information, and transmits the determination result to the biological information acquisition device 10.

In a case where an affirmative determination is made in step S72 (that is, in a case where the connection with the biological information acquisition device 10 is permitted), the process proceeds to step S73, and the second communication unit 36 establishes the connection with the biological information acquisition device 10 via wireless communication. In step S75, the second communication unit 36 receives the biological information from the biological information acquisition device 10 via wireless communication. In step S76, the second communication unit 36 releases the connection with the biological information acquisition device 10 via wireless communication. In step S78, the second management unit 38 stores the biological information received in step S75 in the storage unit 42, and ends the second information processing.

On the other hand, in a case where a negative determination is made in step S72 (that is, in a case where the connection with the biological information acquisition device 10 is prohibited), the second information processing ends without establishing the connection with the biological information acquisition device 10 and receiving the biological information.

As described above, the biological information acquisition device 10 according to the second exemplary embodiment establishes the connection with the terminal device 30 via wireless communication in a case where the connection with the terminal device 30 via wireless communication is permitted in advance and the terminal device 30 is within a communicable range of the wireless communication. That is, when the connection permission targets are set in advance, it is possible to improve usability since the user does not need to input whether or not the connection is possible each time. Furthermore, since an object for which connection is prohibited can be set in advance, it is possible to contribute to the protection of personal information.

Note that, in the second exemplary embodiment, the first communication unit 16 may establish the connection with the terminal device 30 via wireless communication in a case where the terminal device 30 is in the communicable range of the wireless communication. That is, the first communication unit 16 may automatically connect with the terminal device 30 in the communicable range of the wireless communication without performing the collation with the connection permission targets set in advance in the terminal device 30.

Furthermore, in the second exemplary embodiment, a mode has been described in which collation with the connection permission targets set in advance in the terminal device 30 is performed before the biological information is acquired to automatically connect with the terminal device 30 in the communicable range of the wireless communication, but the present disclosure is not limited thereto. For example, the biological information acquisition device 10 may be automatically connected with the terminal device 30 in the communicable range of the wireless communication by performing collation with the connection permission targets set in advance in the terminal device 30 after acquiring the biological information.

Furthermore, in the second exemplary embodiment, a mode has been described in which the biological information acquisition device 10 does not provide guidance for prompting the user to select whether or not to transmit the biological information to the terminal device 30, and automatically establishes the connection with the terminal device 30 in a case where the biological information acquisition device itself is permitted in advance, but the present disclosure is not limited thereto. For example, before or after the connection between the biological information acquisition device 10 and the terminal device 30 via wireless communication is established, guidance for allowing the user to select whether or not to transmit the biological information to the terminal device 30 may be provided.

Furthermore, in each of the exemplary embodiments, the biological information acquisition device 10 may include known payment means using, for example, cash, a credit card, an integrated circuit (IC) card, a QR code (registered trademark), or the like, and may have a function of allowing the user to settle a usage fee. For example, the biological information acquisition device 10 may settle the usage fee before transmitting the biological information to the terminal device 30. Furthermore, for example, the biological information acquisition device 10 may settle the usage fee before the sensor 29 measures the biological information.

Furthermore, in each of the exemplary embodiments, for example, the following various processors can be used as a hardware structure of processing units performing various processes, such as the acquisition unit 12, the first guide unit 14, the first communication unit 16, and the first management unit 18, as well as the second guide unit 34, the second communication unit 36, and the second management unit 38. As described above, in addition to the CPU which is a general-purpose processor executing software (programs) to function as various processing units, the various processors include a programmable logic device (PLD) which is a processor capable of changing a circuit configuration after manufacture such as a field-programmable gate array (FPGA), a dedicated electric circuit which is a processor having a circuit configuration exclusively designed to execute specific processing such as an application-specific integrated circuit (ASIC), and the like.

One processing unit may be configured by one of these various processors, or may be configured by a combination of two or more processors of the same type or different types (for example, a combination of a plurality of the FPGAs or a combination of the CPU and the FPGA).

Furthermore, the plurality of processing units may be configured by one processor.

As an example in which the plurality of processing units are configured by one processor, first, as represented by a computer such as a client and a server, there is a mode in which one processor is configured by a combination of one or more CPUs and software and this processor functions as the plurality of processing units. Second, as represented by a system-on-chip (SoC) or the like, there is a mode in which a processor is used that realizes the functions of the entire system including a plurality of processing units with one integrated circuit (IC) chip. As described above, the various processing units are configured using one or more of the various processors as a hardware structure.

Moreover, more specifically, an electric circuit (circuitry) in which circuit elements such as semiconductor elements are combined can be used as the hardware structure of the various processors.

Furthermore, in each of the exemplary embodiments, an aspect has been described in which the first information processing program 27 is stored (installed) in the storage unit 22 in advance, but the present disclosure is not limited thereto. The first information processing program 27 may be provided in a mode of being recorded on a recording medium such as a compact disc read-only memory (CD-ROM), a digital versatile disc read-only memory (DVD-ROM), or a universal serial bus (USB) memory. Furthermore, the first information processing program 27 may be downloaded from an external device through a network. Moreover, the technique of the present disclosure extends to a storage medium that stores the information processing program in a non-transitory manner, in addition to the information processing program.

Similarly, in each of the exemplary embodiments, an aspect has been described in which the second information processing program 47 is stored (installed) in the storage unit 42 in advance, but the present disclosure is not limited thereto. The second information processing program 47 may be provided in a mode of being recorded on a recording medium such as a CD-ROM, a DVD-ROM, or a USB memory. Furthermore, the second information processing program 47 may be downloaded from an external device through a network. Moreover, the technique of the present disclosure extends to a storage medium that stores the information processing program in a non-transitory manner, in addition to the information processing program.

In the technique of the present disclosure, the above-described exemplary embodiments may be appropriately combined. The above-described contents and illustrated contents are detailed descriptions for parts according to the embodiment of the technique of the present disclosure and are merely one example of the technique of the present disclosure. For example, the description related to the configuration, the function, the action, and the effect is a description related to an example of a configuration, a function, an action, and an effect of a portion according to the technique of the present disclosure. Accordingly, it goes without saying that unnecessary portions may be deleted, new elements may be added, or replacements may be made with respect to the contents and the illustrated contents described above without departing from the scope of the technique of the present disclosure.

The disclosure of Japanese patent application No. 2021-030781 filed on Feb. 26, 2021 is incorporated herein by reference in its entirety. All documents, patent applications, and technical standards described in this specification are herein incorporated by reference to the same extent as if each individual publication, patent application, or technical standard was specifically and individually indicated to be incorporated by reference.

What is claimed is:

1. A biological information acquisition device comprising:
   a first processor; and
   a memory connected to or incorporated in the first processor,
   wherein the first processor is configured to:
   acquire biological information of a user;
   store the biological information in the memory;

transmit the biological information to a terminal device owned by the user via wireless communication;
delete the biological information whose transmission has been completed from the memory; and
establish a connection with the terminal device via the wireless communication in a case where the connection with the terminal device via the wireless communication is permitted in advance and the terminal device is within a communicable range of the wireless communication;
wherein in the terminal device, the biological information acquisition device that is a connection permission target via the wireless communication is set in advance according to at least one of identification information of the biological information acquisition device, a type of the biological information acquired by the biological information acquisition device, or an installation location of the biological information acquisition device, and
wherein the first processor is configured to establish the connection with the terminal device via the wireless communication in a case where the biological information acquisition device is included in the connection permission target set in advance in the terminal device and the terminal device is in the communicable range of the wireless communication.

2. The biological information acquisition device according to claim 1, wherein the first processor is configured to release, after transmitting the biological information to the terminal device, a connection with the terminal device via the wireless communication and deletes a connection history.

3. The biological information acquisition device according to claim 1, wherein the first processor is configured to establish a connection with the terminal device via the wireless communication after acquiring the biological information.

4. The biological information acquisition device according to claim 3, wherein the first processor is configured to establish the connection with the terminal device via the wireless communication in a case where the connection with the terminal device via the wireless communication is permitted.

5. The biological information acquisition device according to claim 1, wherein the first processor is configured to establish a connection with the terminal device via the wireless communication in a case where the terminal device is within a communicable range of the wireless communication.

6. The biological information acquisition device according to claim 1, wherein the first processor is configured to settle a usage fee before transmitting the biological information to the terminal device.

7. The biological information acquisition device according to claim 1, wherein the biological information acquisition device is available for use by an unspecified number of users.

8. The biological information acquisition device according to claim 1, wherein the biological information indicates at least one of a body temperature, a heartbeat, an electrocardiogram, a myoelectricity, a blood pressure, a weight, a body fat percentage, a muscle mass, a bone density, a blood glucose level, a urine sugar, a urine protein, or urine occult blood.

9. The biological information acquisition device according to claim 1, wherein the wireless communication is a communication method using at least one of Bluetooth, a BLE beacon, or an RFID.

10. A biological information acquisition system comprising:
the biological information acquisition device according to claim 1; and
the terminal device including a second processor.

11. The biological information acquisition system according to claim 10, wherein:
the terminal device further includes a storage unit connected to or incorporated in the second processor, and
the second processor is configured to store the biological information received from the biological information acquisition device in the storage unit.

12. The biological information acquisition device according to claim 1, wherein a table in which the identification information of the biological information acquisition device, the type of the biological information acquired by the biological information acquisition device, the installation location of the biological information acquisition device, and connectability information are associated with each other is stored in the terminal device.

13. A biological information acquisition method in which a computer executes processing of:
acquiring biological information of a user;
storing the biological information in a memory;
transmitting the biological information to a terminal device owned by the user via wireless communication;
deleting the biological information whose transmission has been completed from the memory; and
establishing a connection with the terminal device via the wireless communication in a case where the connection with the terminal device via the wireless communication is permitted in advance and the terminal device is within a communicable range of the wireless communication;
wherein in the terminal device, a biological information acquisition device that is a connection permission target via the wireless communication is set in advance according to at least one of identification information of the biological information acquisition device, a type of the biological information acquired by the biological information acquisition device, or an installation location of the biological information acquisition device, and
wherein the connection with the terminal device via the wireless communication is established in a case where the biological information acquisition device is included in the connection permission target set in advance in the terminal device and the terminal device is in the communicable range of the wireless communication.

14. A non-transitory computer-readable storage medium storing a biological information acquisition program for causing a computer to execute processing of:
acquiring biological information of a user;
storing the biological information in a memory;
transmitting the biological information to a terminal device owned by the user via wireless communication;
deleting the biological information whose transmission has been completed from the memory; and
establishing a connection with the terminal device via the wireless communication in a case where the connection with the terminal device via the wireless communication is permitted in advance and the terminal device is within a communicable range of the wireless communication;

wherein in the terminal device, a biological information acquisition device that is a connection permission target via the wireless communication is set in advance according to at least one of identification information of the biological information acquisition device, a type of the biological information acquired by the biological information acquisition device, or an installation location of the biological information acquisition device, and wherein the connection with the terminal device via the wireless communication is established in a case where the biological information acquisition device is included in the connection permission target set in advance in the terminal device and the terminal device is in the communicable range of the wireless communication.

* * * * *